United States Patent [19]

Stevens

[11] 4,322,039
[45] Mar. 30, 1982

[54] PROFILE ACTUATED CABLE WRAPPING APPARATUS

[75] Inventor: Samuel B. Stevens, Pekin, Ill.

[73] Assignee: Caterpillar Tractor Co., Peoria, Ill.

[21] Appl. No.: 245,243

[22] PCT Filed: Jun. 16, 1980

[86] PCT No.: PCT/US80/00768

§ 371 Date: Jun. 16, 1980

§ 102(e) Date: Jun. 16, 1980

[87] PCT Pub. No.: WO81/03652

PCT Pub. Date: Dec. 24, 1981

[51] Int. Cl.³ .................. B65H 81/02; B65H 59/32
[52] U.S. Cl. .................. 242/4 BE; 156/425; 242/45; 242/153
[58] Field of Search .......... 242/4 BE, 4 B, 4 R, 242/153, 7.13, 156.2, 45, 154; 57/3, 10, 18, 19; 156/189, 397, 422, 443

[56] References Cited

U.S. PATENT DOCUMENTS

| | | | |
|---|---|---|---|
| 1,246,260 | 11/1917 | Goodwin | 242/4 B |
| 1,929,087 | 10/1933 | Wood | 242/75.43 |
| 1,994,661 | 3/1935 | Pash | 242/4 B |
| 2,253,740 | 8/1941 | van Hook | 57/18 |
| 2,267,107 | 12/1941 | Juillard | 242/75.43 X |
| 2,833,491 | 5/1958 | Carroll | 242/154 |
| 2,875,570 | 3/1959 | Sarracino | 242/75.43 X |
| 3,486,317 | 12/1969 | Grawey et al. | 57/3 |
| 4,112,660 | 9/1978 | Ferrentino et al. | 242/156 |

FOREIGN PATENT DOCUMENTS 569233 11/1957 Italy .................. 242/45 X

Primary Examiner—Billy S. Taylor
Attorney, Agent, or Firm—Wegner, Stellman, McCord, Wood & Dalton

[57] ABSTRACT

A cable-wrapping apparatus is provided for applying cable (26) to a toroidal, non-cylindrically-shaped body (10) under uniform tension and with a uniform spacing. The machine includes a shuttle (20) rotatable about a transverse section of said body (10), which body is being rotated in a plane transverse to the plane of rotation of the shuttle (20). A compensating apparatus (44) is provided on the shuttle (20) and includes a profile follower roller (62) held in contact with the surface of the body (10) by centrifugal force created by the rotation of the shuttle (20). A compensator wheel (70) on the compensating apparatus (44) moves with the follower roller (62) to control storing of cable (26) during periods of low cable demand and paying out the stored cable (26) during periods of high cable demand.

10 Claims, 5 Drawing Figures

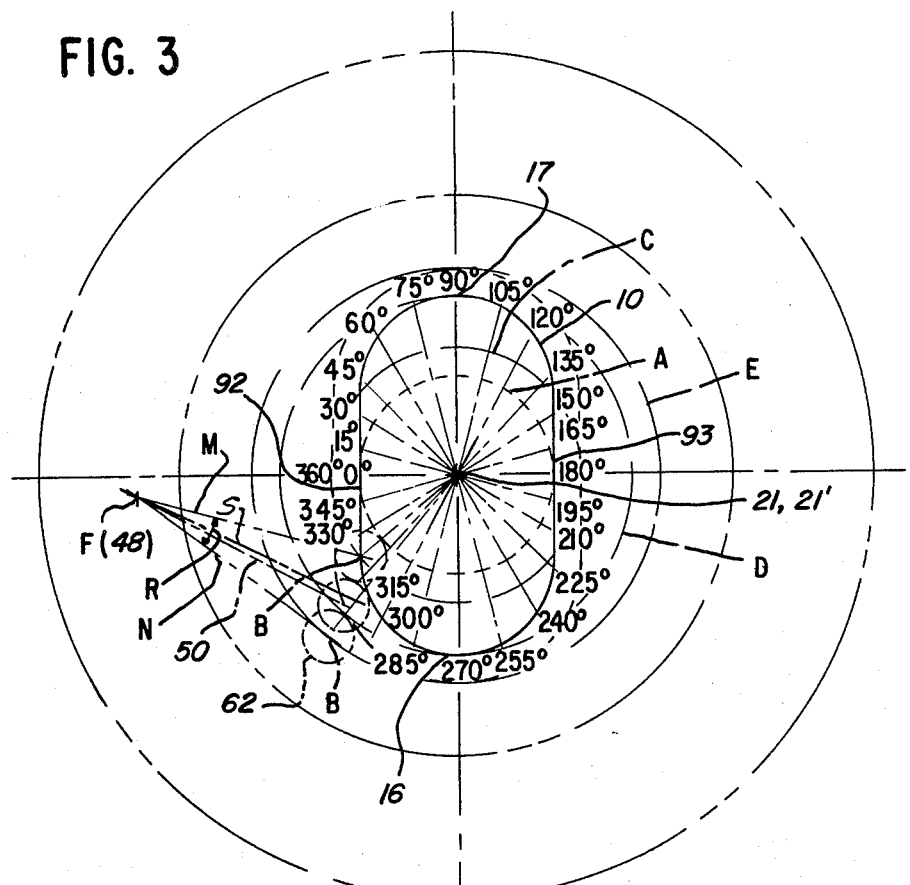
FIG. 3
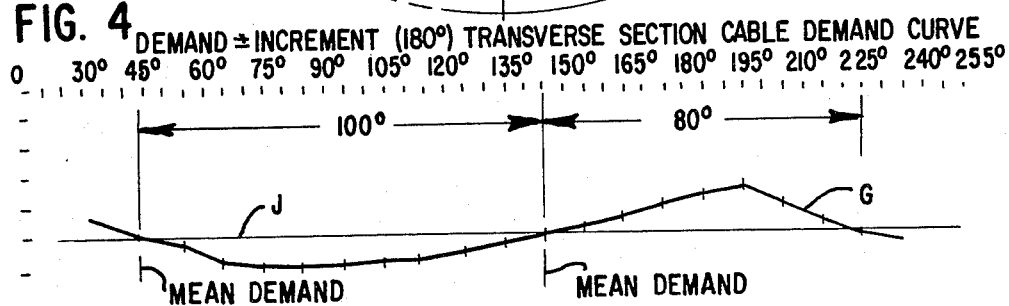
FIG. 4 DEMAND ± INCREMENT (180°) TRANSVERSE SECTION CABLE DEMAND CURVE
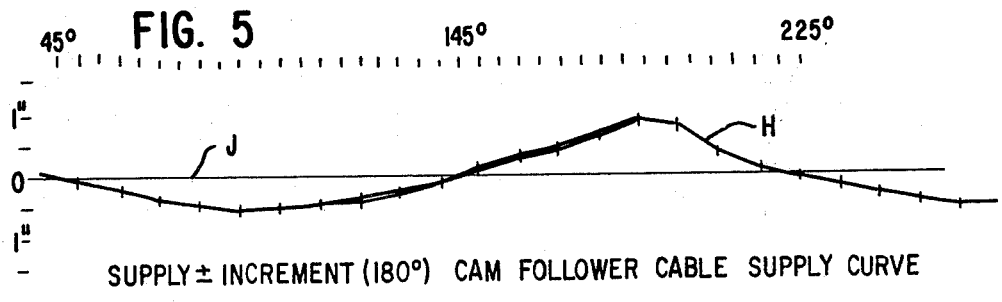
FIG. 5
SUPPLY ± INCREMENT (180°) CAM FOLLOWER CABLE SUPPLY CURVE

PROFILE ACTUATED CABLE WRAPPING APPARATUS

DESCRIPTION

Technical Field

This invention relates to a cable-wrapping apparatus for a toroidal body and, more particularly, to an apparatus for wrapping flexible cable under substantially uniform tension on a toroidal body having a non-circular cross section in a radial plane containing the axis of rotation of the body.

Background Art

In building a tube for a torus-shaped tire, it is important at one stage to wrap the body with cable under substantially uniform tension and with substantially uniform spacing between successive passes of the cable. Since the tube or carcass is not circular in transverse cross section, it is difficult to uniformly wrap a cable in a spiral form on the carcass under uniform tension. Heretofore, an apparatus has been proposed and successfully used to uniformly wrap the toroidal-shaped tire with cable. However, the apparatus is relatively slow and relatively complex, thereby increasing the costs of the resulting tire. Such an apparatus is shown in the Grawey et al U.S. Pat. No. 3,864,188, issued Feb. 4, 1975 and entitled "Tire Wrapping Machine" and is assigned to the common assignee of the present application. In the Graway et al U.S. Pat. No. 3,864,188 patent, the torus-shaped body is mounted with the circumferential plane extending vertically and with a shuttle disposed horizontally, encircling one section of the core body so that as the shuttle rotates about the section of the body and, as the body is rotated through the shuttle about the axis of the body, the cable is wrapped on the body in a spiral configuration.

To maintain the tension of the cable substantially uniform, a cam is provided such that a cam follower on the shuttle adjusts the feed of the cable to the body under a substantially uniform tension through a brake arrangement. Each different cross-sectional configuration of a body requires a separate cam which is oriented on the shuttle in a way as to permit the cable to be laid on the body under a uniform tension. Air pressure is used to hold the cable applicator against the body as the cable is applied thereto. The need for air pressure to retain the applicator roller against the body, together with the complexity of the cam and cam follower and brake, causes a relatively slow application of cable. The prior art system is inherently subject to malfunction upon the loss of air pressure or upon misaligning of the cam with respect to the cross section of the body.

The present invention is directed to overcoming one or more of the problems as set forth above.

Disclosure of Invention

An apparatus is provided which eliminates the cam and substitutes in its stead the configuration of the cross-sectional configuration of the toroidal body against which a profile or cam follower is maintained by centrifugal force so that the cable demand is controlled by the cross-sectional configuration of the body being wrapped. A compensator arm supporting the profile or cam follower has a compensator wheel mounted thereon at a location to add or substract material to the applicator as the profile or cam follower traverses the cross-sectional peripheral configuration of the body. A supply of cable is carried by a supply spool on the shuttle and includes a brake mechanism which permits the cable to be withdrawn from the supply under a uniform tension. The cable traverses a path on the shuttle including passing around the compensator wheel, as the compensator wheel and profile follower are controlled by centrifugal force on a counterweight carried by the compensator arm. The centrifugal force on the counterweight is created by the rotating shuttle as the cable is applied to the body.

The location of the compensator wheel on the compensator arm is determined by the mean cable demand throughout a 360° path of travel about the core body. The compensator arm and compensator wheel provide cable at a changing demand rate relative to the shape of the section while drawing cable off of the spool at a relatively constant rate so as to eliminate any tension surges or lapses caused by the changing demand.

BRIEF DESCRIPTION OF DRAWINGS

FIG. 3 illustrates the geometry used in computing the above and below mean cable demand from which the location of the compensator wheel on the profile follower arm is determined;

FIG. 4 is a cable demand curve plotted relative to a mean demand, the measurements for the cable demand curve being taken at regular intervals about a transverse section of the body; and FIG. 5 is a cable supply curve plotted relative to a mean supply, the measurements for the cable supply curve being taken at the same regular intervals as the measurements for the demand curve of FIG. 4.

BEST MODE FOR CARRYING OUT THE INVENTION

Figure 1:
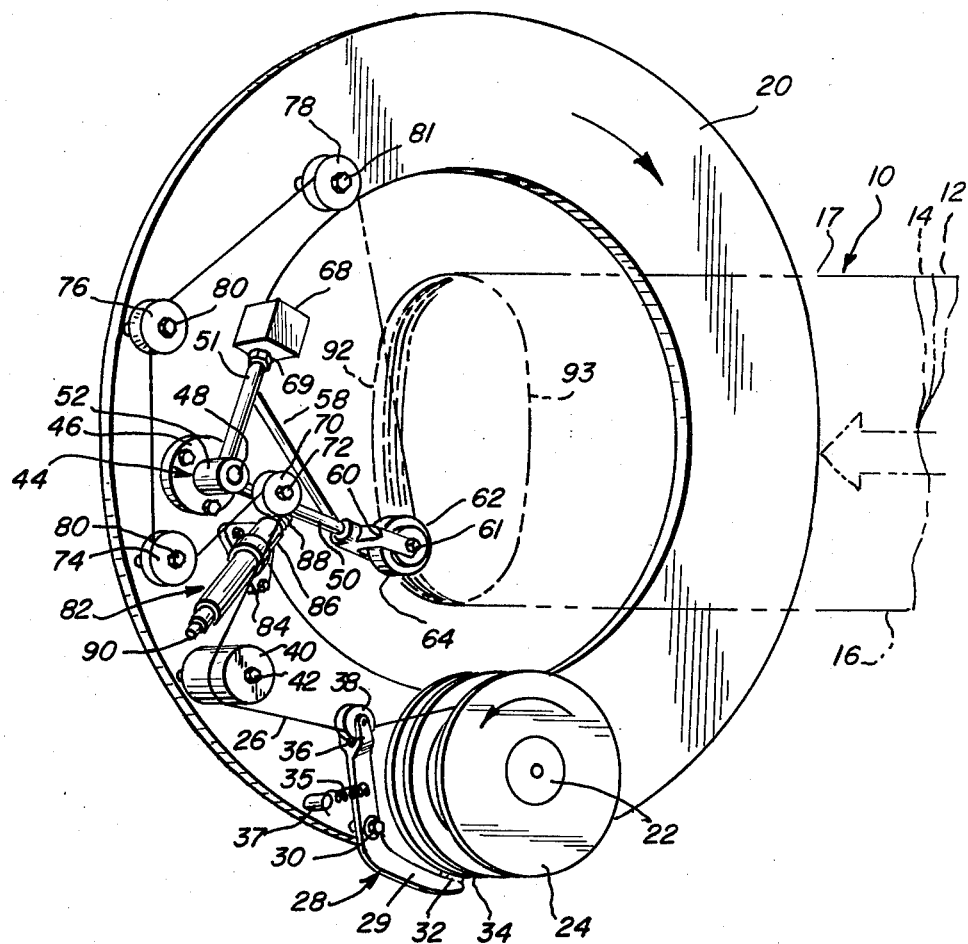
FIG. 1 is a perspective view of a shuttle encircling a toroidal body for applying cable to the body and illustrates the structure of the invention.
Figure 2:
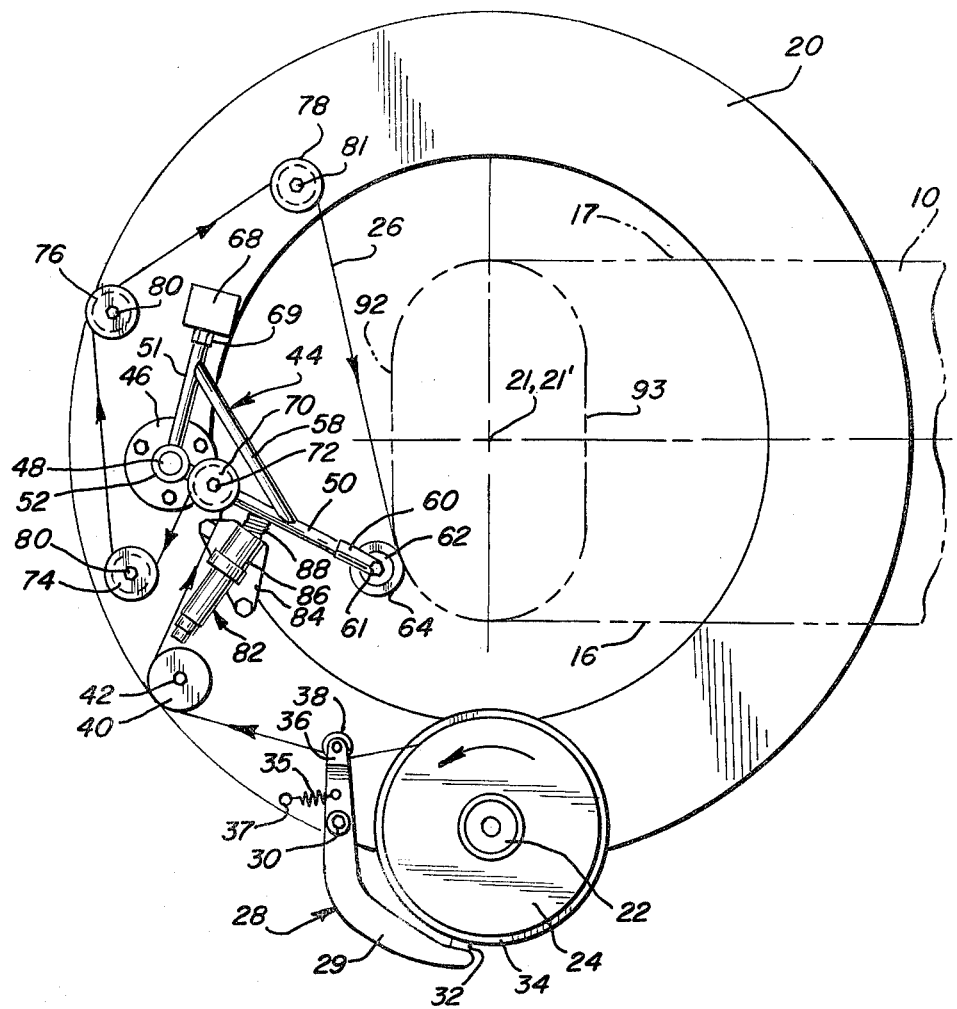
FIG. 2 is an elevational view of the shuttle with the compensator in position for applying cable to the toroidal body.

Referring to FIGS. 1 and 2, a toroidal member or body 10, which may be a core 12 about which one or more layers 14 of elastomeric material has been wrapped, is shown in phantom in a horizontal position lying on a side wall 16 with a shuttle 20 encircling a transverse segment of said body 10. The member or body 10 is adapted to be rotated about the rotational axis of the body substantially in a plane parallel to the mid-circumferential plane thereof. Throughout this description, the toroidal member 10 will be described as being wrapped with cable when in the horizontal position illustrated in FIGS. 1 and 2, however, it is to be understood that the toroidal body 10 could have the mid-circumferential plane extending vertically with the plane of the shuttle 20 lying horizontally and substantially perpendicular to said vertical plane. In building a torus tube tire of the type illustrated in the Charles E. Grawey U.S. Pat. No. 3,606,921, issued Sept. 21, 1971, entitled "Belted Oval Pneumatic Tube-Tire", and assigned to the common assignee of the present application, various apparatuses have been proposed whereby a shuttle lies in a plane at a slight angle to the circumferential plane of the toroidal member and applies cable to the toroidal member as the toroidal member is rotated about its axis and as the shuttle is rotated about a transverse section of the toroidal body.

In practice, the toroidal member 10 is comprised of the core 12 made of sand and binder about which has been wrapped or vacuum formed one or more layers 14 of elastomeric material. The wrapped core or toroidal member 10 is then delivered to the cable-wrapping station where it is positioned in the shuttle 20 so that the geometric center 21 of the shuttle 20 substantially coincides with the geometric center 21' of a transverse section of the toroidal body 10 intersected by the plane of the shuttle 20. The shuttle 20 is substantially circular and has a mechanism, not shown, for rotating the shuttle 20 in the plane of the shuttle about a transverse section of the core 12.

Mounted on the shuttle 20 is a spindle 22 to which a spool 24 containing a supply of cable 26 is removably connected. A brake 28 comprised of an arcuate-shaped bar 29 is pivoted at 30 to the shuttle 20 with a brake pad 32 carried by one end of the bar 29 bearing against a brake disc 34 operatively connected to the spool 24. The end of the bar 29 spaced from the pad 32 has a bifurcated end portion 36 to which a V-groove pulley 38 is rotatably mounted. A tension spring 35 is anchored at one end to a pin 37 carried by the shuttle 20 and is fastened at its other end to the portion of the bar 29 between the pivot 30 and the pulley 38. The spring 35 urges the brake pad 32 against the disc 34 so that cable 26 pulled from the spool 24 against the loading of the brake will have a uniform tension. A sleeve roller 40 is freely rotatably mounted on a spindle 42 affixed to the shuttle 20 at a location circumferentially spaced from the spool 24. The cable 26, upon leaving the spool 24, passes in contact with the pulley 38 between the pulley 38 and the bifurcated portion 36 of the brake and extends on to and partially around the radially outward surface of the sleeve roller 40. The tension in the cable 26 caused by the resistance of the brake, will act through the pulley 38 and brake 28 to reduce the brake force on the disc, thereby reducing the tension required to pull the cable from the spool. The spring 35 will then start to reapply the brake 28. Ultimately, an equilibrium will be reached whereby the cable will be removed from the spool 24 under a substantially uniform tension.

A cable compensating apparatus 44 is pivotally mounted on the shuttle 20 and comprises a compensator or profile follower arm 50 and a counterweight arm 51, both affixed to a hub 52 at an angle to each other slightly in excess of 90°. A plate 46 having a transversely extending pivot shaft 48 is bolted to the shuttle 20 in spaced relation to the sleeve roller 40. The hub 52 of the compensating apparatus 44 is pivotally affixed to the shaft 48 so that the compensator or profile follower arm 50 and the counterweight arm 51 are movable in a plane parallel to the shuttle 20. A support brace 58 extends between the profile follower arm 50 and the counterweight arm 51 so as to add rigidity thereto. A bifurcated holder 60 is secured to the outer end of the profile follower arm 50 and has a pivot 61 extending between the legs of the holder 60 for rotatably supporting a cam follower roller 62 between said legs of the holder 60. The cam follower roller 62 has a crowned contact surface 64 for rolling contact with the surface of the toroidal body 10 as will be described hereinafter. A counterweight 68 is secured, as by threading thereon or the like, to the outer end of the counterweight arm 51 and is held against becoming loose by a jam nut 69.

A compensator wheel 70, which is in the form of a V-groove pulley, is rotatably mounted on the profile follower arm 50 by means of a pivot shaft 72 affixed to said arm 50. The plane of rotation of the pulley wheel 70 is parallel to the plane of rotation of the compensating apparatus 44. Two V-groove idler pulleys 74,76 are rotatably mounted at spaced apart points on the shuttle 20 by means of pivot shafts 80 extending transversely to the plane of the shuttle 20. A let-off or applicator V-groove pulley 78 is rotatably mounted on the shuttle 20 by means of a pivot shaft 81 at a point circumferentially spaced from the idler pulley 76. The pivot shafts 80,81 have spacers between the shuttle 20 and the pulleys 74,76,78 so as to locate the valleys of the V-grooves in a plane parallel to the plane of the shuttle 20 and containing the valley of the V-groove of the pulley wheel 70.

The cable 26, after leaving the sleeve roller 40, passes around the compensator wheel 70, doubles back upon itself and around the idler pulley 74, around idler pulley 76, and then around applicator pulley 78 into engagement with the toroidal body 10 at, or just ahead of, the area of contact between the cam follower roller 62 and the body 10. Preferably, the applicator pulley 78 is positioned relative to the cam follower roller 62 such that the cable is applied to the low demand areas of the member when the cam follower roller 62 moves toward the common centers 21,21' and is applied to the high demand areas of the member when the cam follower roller 62 moves away from the common centers 21,21'. An energy dissipating member 82 is mounted on a bracket 84 on the shuttle 20 between the sleeve roller 40 and the idler pulley 74 and in relatively close proximity to the plate 46. A sleeve 86 carried by the bracket 84 encircles the member 82 and directs a spring 88 of the member 82 into engagement with the profile follower arm 50. The energy dissipating member 82 is of a type generally available on the market, one such device being sold by Enidine of Buffalo, New York and is identified in their bulletin No. 1183-1-77 as an OEM shock. The energy absorbing characteristics of the member 82 are controlled by turning a knob 90 on the one end thereof.

As the shuttle 20 is rotated in a clockwise direction about the rotating core body 10, the cable 26 will be applied in a spiral pattern to the outer periphery of the body. The rotation of the shuttle 20 will apply a centrifugal force to the counterweight 68 which will pivot the compensating apparatus 44 in a counterclockwise direction so as to urge the profile follower arm 50 and cam follower roller 62 against the outer surface of the toroidal member 10.

It will be observed that due to the noncircular cross-sectional configuration of the body 10, the cable 26 being applied to inner and outer peripheral sides 92,93 of the body 10 will be at a low demand rate of application while the cable 26 being applied around the circular side walls 16,17 of the body 10 will be at a high demand rate of application. The compensator wheel 70 on the profile follower arm 50 travels with the pivot shaft 72 a proportional amount so as to provide the increase or decrease supply of material depending upon the location of the cam follower roller 62 on the body. The location of the compensator wheel 70 along the axis of the profile follower arm 50 is important and, when properly located, will provide the increased rate of supply of cable during high demand and will store the excess cable during low demand. Cable is drawn from the spool at a uniform rate and is applied to the body at a changing demand rate controlled by the shape of the section of the body.

During periods of low cable demand, the compensator or profile follower arm 50 rotates about its pivot mounting 48 toward the common center 21,21' of both the shuttle 20 and the body 10, respectively. In this mode, cable 26 is being let off the cable spool 24 at a constant rate and is being stored within the lineal length of the cable path between the roller 40, the compensator wheel 70 and the idler pulley 74. During periods of high cable demand, the compensator arm 50 pivots away from the common centers 21,21' of the shuttle and body and, as a result, the cable stored during the low demand mode is applied to the body. To provide the correct amount of cable 26 during periods of both high and low cable demand, it is important to properly locate the compensator wheel 70 along the axis of the profile follower arm 50.

To locate the center of the compensator wheel 70, reference is made to FIGS. 3, 4 and 5. It is known that the application of cable by a shuttle 20 to a body that is circular in transverse cross section requires a uniform source of supply and a uniform tension since at every point around the periphery of the circular cross section, the rate of application of the cable is constant. Accordingly, assuming the smallest radius of the cross section of the body 10 lying along the horizontal axis is used to subscribe a circle A which will be tangent to the body 10 at the inner and outer peripheral sides 92,93. The center B of the roller 62 will subscribe a circle C about the circle A so that if body 10 were circular in cross section equal to circle A, material would be uniformly applied at the minimum rate of application. Likewise, drawing a circle D tangent to the largest radius of the cross section of the body 10 and a circle E for the center B of the roller 62 as it rolls around the circle D would establish the maximum uniform rate of application of cable about the largest radius of cross section of the body 10. The centerline of profile follower arm 50 extends from the pivot center F of the compensator apparatus 44 to the center B of the roller 62 so that when the roller 62 contacts the minimum theoretical circle A, the centerline of arm 50 is at location M and when the roller 62 contacts the maximum theoretical circle E, the centerline of arm 50 is at location N subscribing an arc R therebetween.

Connecting the center 21, 21' of the shuttle 20 and body 10 with the points of intersection between the centerlines M and N with the minimum circle C and the maximum circle E subscribes an arc therebetween which equals approximately a 10° phase differential between the maximum demand and the minimum demand curves. Assuming the 45° radial as the location of mean cable demand, by an actual measurement at each radial line eminating from the center point 21,21' of the body 10, either an above mean or a below mean cable demand was found. The measurements were plotted relative to a mean line J as demand curve G in FIG. 4 illustrates the above mean and below mean cable demand. Only the demand curve between 45° and 225° is illustrated in FIG. 4, it being understood that the curve repeats itself through a full 360° circle. It will be noted that there are two phases equaling approximately 100° duration (between 45° and 145° and between 225° and 325°) where the cable demand is above mean. Likewise, there are two phases of approximately 80° duration (between 145° and 225° and between 325° and 45°) where the cable demand is below mean. The maximum above and the maximum below mean cable demands are at the high points of the curves.

Assuming the midpoint of the arc R coincides with the mean cable supply and lies on the centerline S of arm 50 midway between the centerlines M and N, the pivot shaft 72 for the compensator wheel 70 is moved along the centerline S (which is the arm 50) until the distance from the pivot shaft 72 on centerline S to centerline M equals one-half the maximum above mean cable supply (equal to the above mean cable demand) and the distance from the pivot shaft 72 on the centerline S to the centerline N equals one-half the maximum below mean cable supply (equal to the below mean cable demand). That is, the pivot shaft 72 of the compensator wheel 70 is located along the axis of the profile follower arm 50 at a point where one-half the sum of the maximum above mean and maximum below mean cable supply equals the distance between the location of the profile follower arm 50 when the follower roller 62 is at a minimum position (on circle E) and then at a maximum position (on circle C). FIG. 5 is a plot of the cable supplied showing that at 45°, 145°, 225° and 325° the cable supplied is equal to the mean amount. Between the mean supply locations, above mean amounts are supplied between 145° and 225° and again between 325° and 45° with below mean amounts supplied between 45° and 145° and between 225° and 325°. Accordingly, by locating the pivot shaft 72 of the compensator wheel 70 at the appropriate point along the profile follower arm 50, the compensator wheel 70, as it moves between a maximum and a minimum position under the influence of the roller 62 will store cable during periods of low cable supply (and demand) and will pay out the stored cable during periods of high cable supply (and demand).

Industrial Applicability

A toroidal body 10 has a spiral wound wrapping of cable 26 applied thereto under uniform tension and at a uniform spacing. The compensating apparatus 44 on the shuttle 20 has the compensator wheel 70 positioned on the profile follower arm 50 at a location to provide proper amounts of cable 26 during periods of high cable supply and demand and to store cable during periods of low cable supply and demand.

The compensating apparatus 44 has the cam follower roller 62 on the end of the profile follower arm 50 bearing against the surface of the body 10 to dictate to the compensator wheel 70 when either a period of high cable demand or a period of low cable demand is occurring. The follower roller 62 is urged against the toroidal body 10 by the rotating force of the shuttle 20 creating a centrifugal force on the counterweight 68 of the compensating apparatus 44. As the shuttle 20 rotates about a section of the rotating body 10, the roller 62 will move the compensator wheel 70 between the cable storing position and the cable paying out position so that the cable passing from the pulley 78 to the surface of the body 10 will be applied to the body at the point of contact of the roller 62 to the body, or just ahead of said roller 62. The roller 62 serves not only as the cam follower for determining the cable demand, but also acts as a stitcher to stitch the cable to the underlying layers of elastomeric material. The brake 28 restrains the spool 24 so that the cable is withdrawn from the spool 24 under a uniform tension.

The energy absorbing member 82 resiliently bears against the follower arm 50 of the compensating apparatus 44 to absorb vibrations and shocks in the apparatus 44 and to smooth out roughness caused by accelerating and decelerating the rotation of the shuttle 20.

Other aspects, objects and advantages of this invention can be obtained from a study of the drawings, the disclosure and the appended claims.

I claim:

1. In an apparatus for winding flexible elongated material (26) on a member (10) having a non-cylindrical cross-sectional shape which causes variations in the demand for elongate material being applied thereto, the apparatus including a shuttle (20), a supply (24) of elongate material (26) carried by the shuttle (20) and having tensioning means (28) for applying tension to the elongate material as said material is drawn from said supply (24), and pulley means (40,74,76,78) carried by said shuttle (20) for guiding said material from said spool (24) to said member (10), the improvement comprising:
   compensating means (44) pivotally mounted on said shuttle (20) and being operable independent of said tensioning means,
   a follower roller (62) carried by said compensating means (44) in rolling contact with said member,
   means (68) for urging said follower roller (62) against said member,
   a compensator wheel (70) pivotally mounted on said compensating means (44) for movement with said compensating means (44) as said roller (62) traverses the surface of said member;
   said elongate material (26) passing over said compensator wheel (70) as it traverses from said supply (24) toward said member (10), said compensator wheel (70) will store elongate material during periods when said roller (62) passes over areas on the member of low material demand and will pay out stored elongate material during periods when said roller (62) passes over areas on the member of high material demand.

2. In an apparatus as claimed in claim 1 wherein said compensating means (44) comprises a profile follower arm (50) pivotally mounted on shuttle (20), said follower roller (62) being carried by said follower arm (50).

3. In an apparatus as claimed in claim 1 wherein said means (68) for urging said follower roller (62) is a counterweight (68) carried by said compensating means (44) in spaced relationship from said follower roller (62), said counterweight (68) acting under the centrifugal force of said rotating shuttle (20) to urge said roller (62) against said member.

4. In an apparatus as claimed in claim 3 wherein said compensating means (44) comprises a counterweight arm (51) connected to said follower arm (50) for pivotal movement therewith, said counterweight (68) being carried by an extremity of said counterweight arm (51).

5. In an apparatus as claimed in claim 4 wherein said compensator wheel (70) is mounted on said follower arm (50) whereby movement of said roller (62) on said member will pivot the follower arm (50) and compensating wheel (70) to store material (26) and to pay out said stored material (26).

6. In an apparatus as claimed in claim 2 wherein an energy dissipating means (82) is carried by said shuttle (20) and bears against said follower arm (50) to smooth out sudden shocks and vibrations in said follower arm (50).

7. An apparatus for winding flexible elongate material (26) on a member (10) having a non-cylindrical cross-sectional shape which causes variations in the demand for elongate material being applied thereto, the apparatus including a shuttle (20), a supply (24) of elongate material (26) carried by the shuttle (20) and having tensioning means (28) for applying tension to said material as it is drawn from said supply (24), pulley means (40,74,76,78) carried by said shuttle (20) for guiding said material from said spool (24) to said member (10), and compensating means (44) carried by said shuttle (20) for increasing and decreasing the amount of material delivered to said member, said compensating means comprising:
   a profile follower arm (50) pivotally mounted on said shuttle (20),
   a follower roller (62) carried by said arm (50) in engagement with said member,
   a counterweight arm (51) connected to said follower arm (50) for pivotal movement therewith,
   a counterweight (68) carried by a free end of said counterweight arm (51),
   a compensator wheel (70) pivotally mounted on follower arm (50) for movement with said follower arm (50) as said roller (62) traverses the surface of said member,
   said elongate material (26) passing over said compensator wheel (70) as it traverses from said supply (24) toward said member (10), said compensator wheel (70) will store elongate material (26) during periods when said roller (62) passes over areas on the member of low material demand, and will pay out stored elongate material during periods when said roller (62) passes over areas on the member of high material demand.

8. An apparatus as claimed in claim 7 wherein said follower roller (62) has a crowned contact surface (64) bearing against the member (10).

9. An apparatus as claimed in claim 7 wherein an energy absorbing member (82) is carried by said shuttle (20) and resiliently bears against said follower arm (50).

10. An apparatus as claimed in claim 7 wherein an applicator pulley (78) is rotatably mounted on said shuttle (20) in alignment with the surface of said member (10), said elongate material (26) passes around said applicator pulley (78) as said applicator pulley (78) guides the material onto the surface of said member (10).

* * * * *